(12) United States Patent
Ramakrishnan et al.

(10) Patent No.: US 7,623,534 B1
(45) Date of Patent: Nov. 24, 2009

(54) METHOD AND SYSTEMS FOR CONTENT ACCESS AND DISTRIBUTION

(75) Inventors: Kadangode Ramakrishnan, Berkeley Heights, NJ (US); William Fenner, Woodside, CA (US); Michael Rabinovich, Solon, OH (US); Divesh Srivastava, Summit, NJ (US); Yin Zhang, Austin, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 430 days.

(21) Appl. No.: 11/322,828

(22) Filed: Dec. 30, 2005

Related U.S. Application Data

(60) Provisional application No. 60/715,993, filed on Sep. 9, 2005, provisional application No. 60/715,952, filed on Sep. 9, 2005.

(51) Int. Cl.
*H04L 12/56* (2006.01)
(52) U.S. Cl. .................... 370/408; 370/395.32
(58) Field of Classification Search ......... None
See application file for complete search history.

(56) References Cited

U.S. PATENT DOCUMENTS

| 6,807,632 | B1 * | 10/2004 | Carpentier et al. | 713/165 |
| 6,850,980 | B1 * | 2/2005 | Gourlay | 709/226 |
| 7,114,003 | B2 * | 9/2006 | Chapman et al. | 709/238 |
| 2005/0108518 | A1 * | 5/2005 | Pandya | 713/151 |

\* cited by examiner

*Primary Examiner*—Daniel J Ryman
*Assistant Examiner*—Tito Pham
(74) *Attorney, Agent, or Firm*—Larson Newman & Abel, LLP

(57) ABSTRACT

Distribution of content between publishers and consumers is accomplished using an overlay network that may make use of XML language to facilitate content identification. The overlay network includes a plurality of routers that may be in communication with each other and the publishers and consumers on the Internet. Content and queries are identified by content descriptors that are routed from the originator to a nearest router in the overlay network. The nearest router, for each unique content descriptor, generates a hash identification of the content descriptor which is used by remaining routers in the overlay network to provide the appropriate functions with respect to the content descriptor. In particular, this allows all routers in the overlay network except the nearest router to properly route content without processing every content descriptor.

9 Claims, 3 Drawing Sheets

METHOD AND SYSTEMS FOR CONTENT ACCESS AND DISTRIBUTION

CROSS-REFERENCE TO RELATED APPLICATIONS

This application claims priority under 35 U.S.C. §119 to U.S. Provisional Patent Application Ser. No. 60/715,993 entitled "XTreeNet: Scalable Overlay Networks for XML Content Dissemination and Querying (Synopsis)" filed in the name of Fenner et al. on Sep. 9, 2005, and further claims priority under 35 U.S.C. §119 to U.S. Provisional Patent Application Ser. No. 60/715,952 entitled "Method and Systems for Content Access and Distribution" filed in the name of Fenner et al. on Sep. 9, 2005, the entirety of both of which are hereby incorporated by reference.

TECHNICAL FIELD

This disclosure generally relates to data processing, and in particular it relates to remote data accessing using interconnected networks.

BACKGROUND OF THE DISCLOSURE

Information is increasingly being created, exchanged and stored in the eXtensible Markup Language (XML). XML is suitable for this purpose because of its flexibility and self-describing nature. Namely, it is human readable, while at the same time it is convenient for machine processing. Examples of XML-based information include a large number and variety of electronic newspapers, technical journals, bibliographical databases, and healthcare databases. Almost every Internet web site run by large organizations with useful information content makes this information available as XML now.

These information sources are typically geographically dispersed across a network, as are the potential consumers of this information. Communicating XML-based information presents opportunities and challenges from a networking perspective. A network that can efficiently forward XML data can be advantageous, as it can offload the filtering of tremendous volumes of data from consumers. Or, it can reduce the load on the source and the network, by avoiding sources having to broadcast information to individual consumers. Using network layer IP multicast, while alleviating the problem somewhat, is not efficient enough because it results in traffic concentration, especially in an environment with a large number of sources.

Commercially, DATAPOWER offers network appliances that accelerate XML parsing, validation, and encryption. SARVEGA also offers an appliance for XML subscription processing. SEMANDEX offers appliances that can be connected into a network, and used for routing a query to relevant data sources. However, certain of these require that queries use a proprietary XML dialect for describing and querying content, and, in various of these solutions, the queries are processed by each router en-route.

Accordingly, there is a need for a system for content access and distribution that addresses certain shortcomings of existing technologies.

SUMMARY OF THE DISCLOSURE

The present disclosure, therefore, introduces various embodiments of methods and systems for disseminating content using an overlay network. The overlay network has a plurality of suitably programmed routers in communication with a plurality of providers and consumers of content. According to various embodiments, a first router in the overlay network receives a unique content descriptor. The content descriptor may correspond to content published by a publisher or to queries or subscriptions generated by a consumer, such a subscriber for content. The first router generates a tuple, including a hash identifier based on the content descriptor. The tuple may further include the content descriptor itself and identification of the first router as a coordinator router for the content descriptor. The tuple, including the hash identifier, is then transmitted to a plurality of subsequent routers in the overlay network. Queries and or content received by any of the subsequent routers in the network may then be matched to content descriptor received by the first router, using only the tuple, or more specifically, the hash identifier in the tuple. Accordingly, each subsequent router need not process the entire content descriptor to determine appropriate routing of data in the overlay network.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
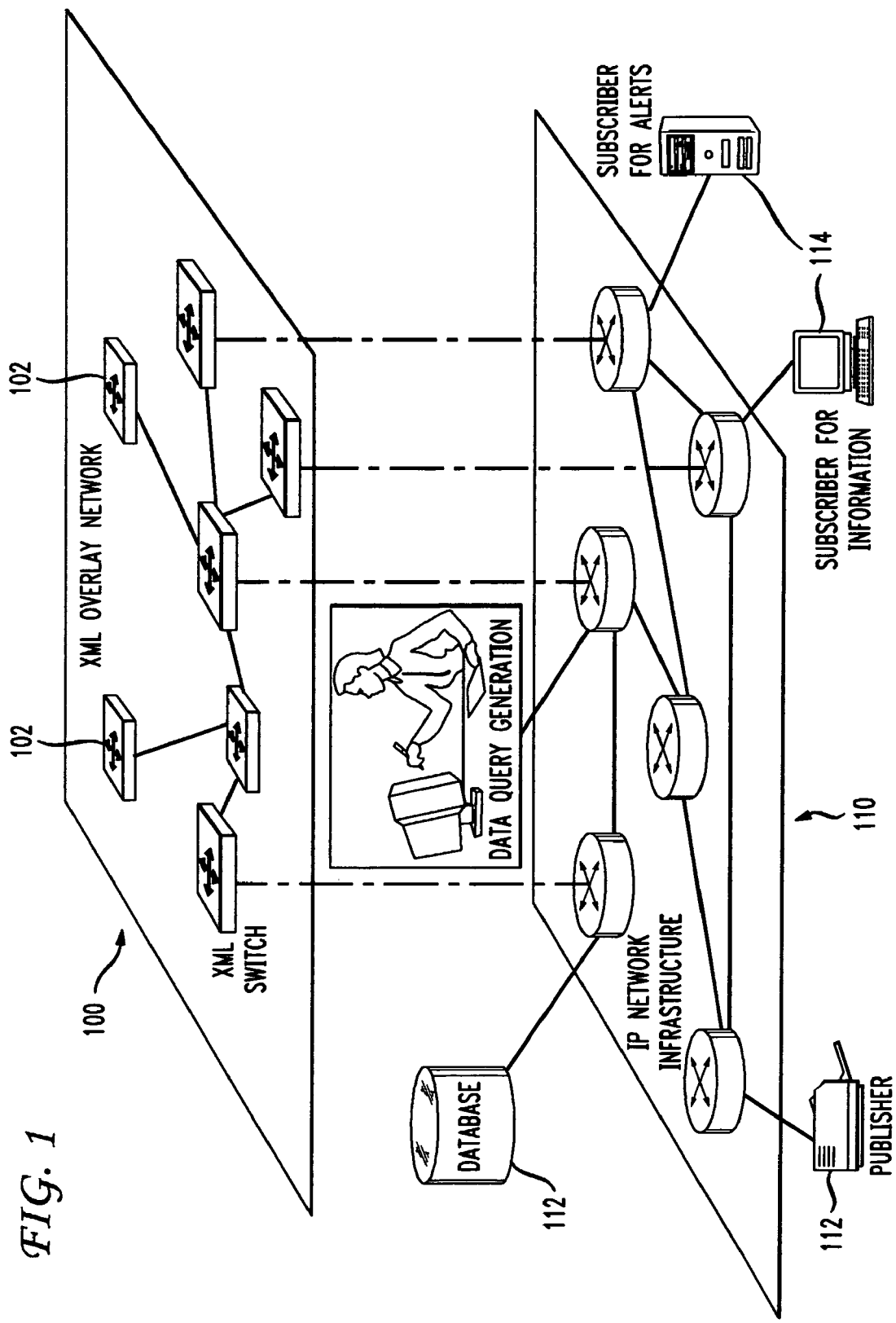
FIG. 1 is a diagram illustrating an exemplary overlay network over which the processes of the present disclosure may be performed.
Figure 2:
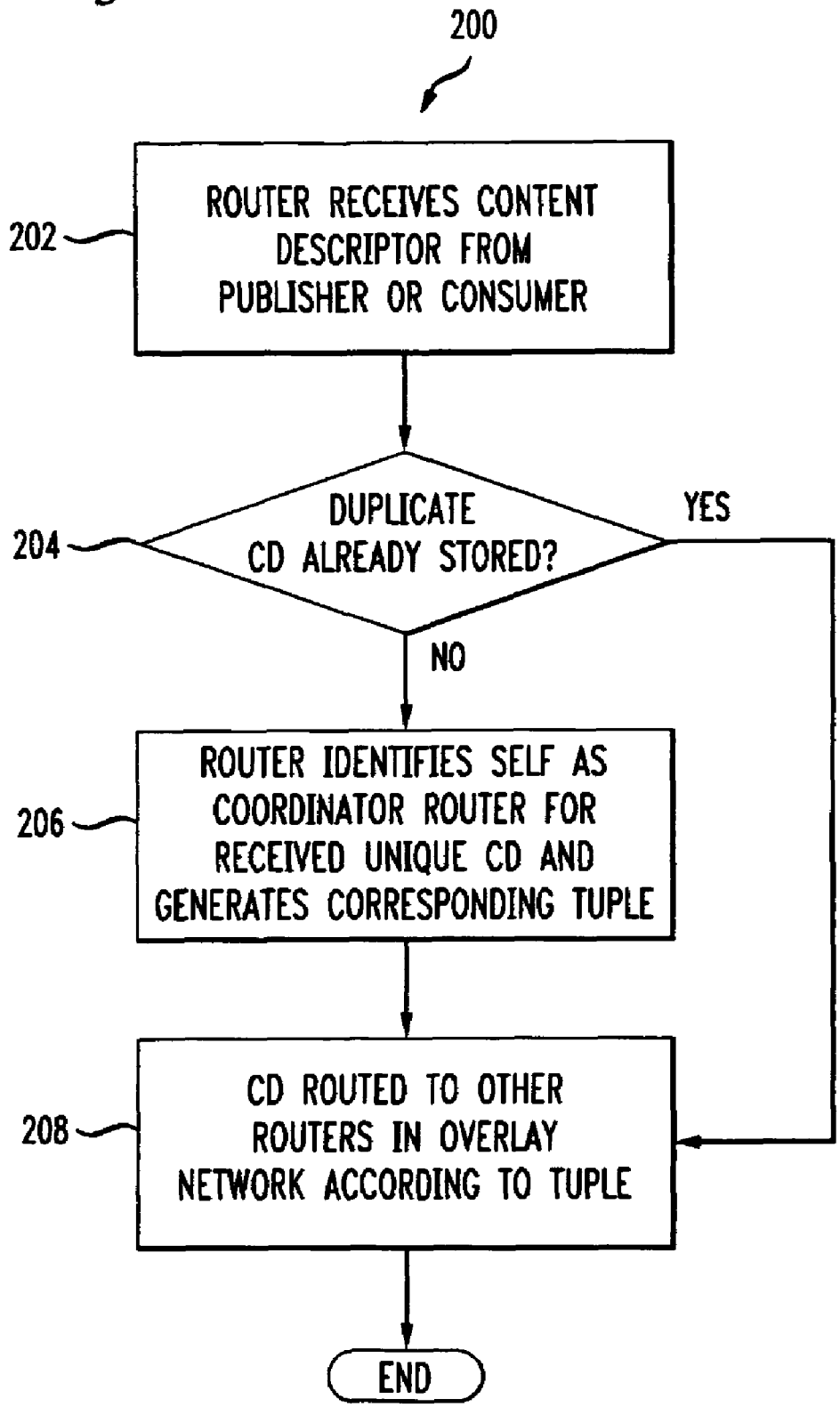
FIG. 2 is a flowchart of an exemplary content distribution process as may be performed over the network of FIG. 1.
Figure 3:
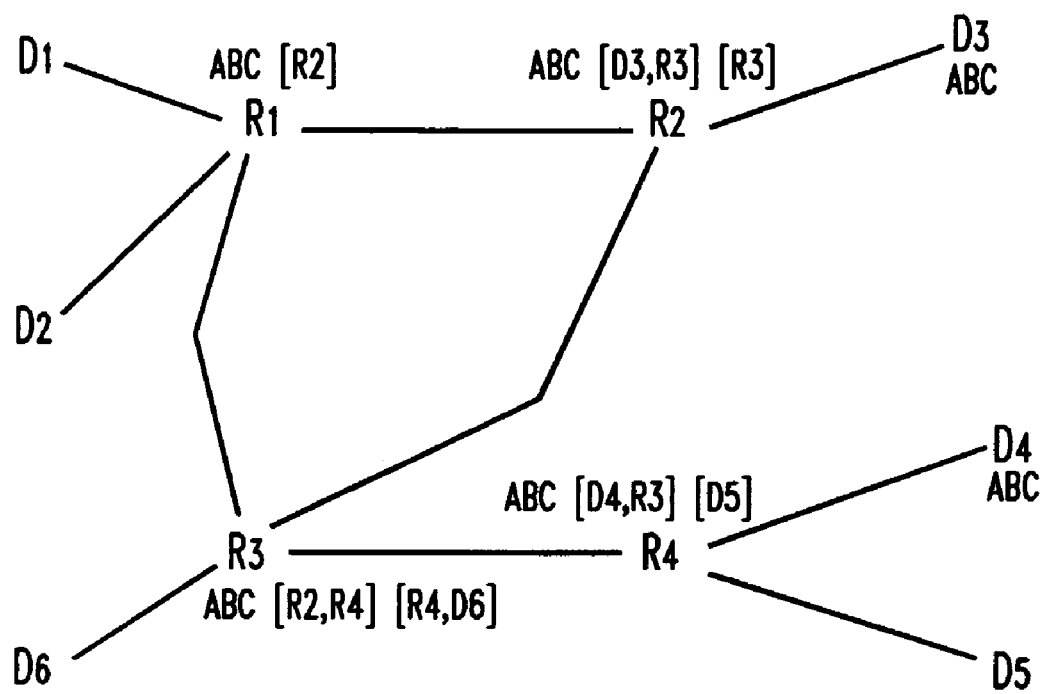
FIG. 3 is a schematic diagram of exemplary data source and router interactions as may be performed over the network of FIG. 1.

Referring now to FIGS. 1-3, wherein similar components of the present disclosure are referenced in like manner, various embodiments of a method and systems for content access and distribution will now be described in more detail.

As more and more information is becoming available electronically, both information consumers and information sources face increasing challenges. For consumers, it is very difficult to identify sources for desired information available over a large network, such as the Internet. For information sources, it is likewise very hard to identify interested consumers. The solution to both these problems is to support content-based dissemination and content-based querying of information, where the network itself is responsible for identifying sources and interested consumers for various content.

When the information need is on a topic of long-standing interest to a particular consumer, standard information subscription systems offer considerable convenience in this regard. However, many of the problems observed with existing large-scale publishing and event-notification can be considerably helped by having a content-oriented publish/subscribe system, where the network itself acts as the intermediary. In such case, the network may facilitate the dissemination of the information by setting up the appropriate distribution trees, based on the content and subscriber interests.

When the information need is for a specific piece of information or it is on a transient or a newly emerging topic, a standard database-style query/response model is more appropriate than a standard publish/subscribe model. A fundamental problem then becomes one of identifying the distinct information sources on the network that are relevant to consumer content queries, and enabling seamless access independent of where, and across what sources, the information is stored. The framework for querying these networked information sources has traditionally been quite different from the publish/subscribe model in that individual queries are posed to individual sources for processing. The only external support that may be available are search engines that provide location information for the consumer. However, these does not always lend itself to providing up-to-date real-time information to a query, because the location information at the search engine may be limited and/or out of date.

Referring now to FIG. 1, an XML tree-based overlay network 100 is introduced herein to accomplish more efficient XML content distribution via XML routers 102, that interact with a network 110, which may be, for example, the Internet. Publish/subscribe and query/response models are unified within the XML overlay network's infrastructure for distributing content made available by XML-based information sources 112 for viewing by one or more consumers 114. It additionally enables such capabilities as XML transformation, duplicate elimination, relevance-score based filtering, and access control, as described in more detail below.

This framework for the overlay network 100 lends itself to a variety of applications. For example, one such application described in detail herein is a "super-newspaper" application that may connect any number of electronic newspapers to any number of consumers 114 across the network 110, each of whom provide requests or queries on news on topics of interest from any and all of sources 112 of the electronic newspaper content.

As a shared infrastructure, the overlay network 100 provides a balance between being generic enough to support a large range of applications (as all Internet Protocol (IP) networks attempt to do) and providing critical functionality. In the past, when the need for efficient application-level support within a network was desired for pervasive applications, various support sources were available. Examples include L7 switches, application-aware firewalls, and Secure Socket Layer (SSL) accelerators. The introduction of application level support into a network is desirable when there are significant performance gains from offloading considerable amounts of duplicate effort at a large number of end-systems, or when functionality rightfully belongs in a network, such as the need for a trusted intermediary. With XML becoming a ubiquitous format for data communication, XML-aware overlay networks according to the present disclosure will provide support to applications that communicate using this data format, for both performance reasons (e.g., to offload filtering of data that is considered irrelevant to the end-system) and functionality reasons (e.g., access control and maintaining privacy).

A second application for XML overlay networks are in the field of cooperative healthcare. There are thousands of hospitals, clinics, and health care providers who maintain medical records of patients. These records are of considerable interest to millions of patients and the medical doctors treating them, who may be interested in specific information (tests carried out on a specific patient in the last 2 years, techniques used to detect specific diseases), but want to get this information from all possible, relevant sources.

In these, and many other applications, there is a concerted attempt at making information available as XML. For electronic newspapers, the Real Simple Syndication (RSS) XML format has become the dominant format for distributing news headlines on the Internet. For healthcare, the Health Level 7 (HL7) consortium is standardizing XML formats for patient records and other aspects of health care, and health care information is becoming increasingly available in XML format. Content-based subscriptions (i.e., standing queries) and ad hoc queries against these information sources can be naturally expressed in XML query languages like XPATH.

Hereinafter, the overlay network 100 of the present disclosure will be described within the context of the super-newspaper application, focusing on the functionalities required and the utility of the overlay network 100 in providing these functionalities. However, it should be readily appreciated that a variety of other environments may similarly use the overlay network 100 described herein.

Essentially, the super newspaper, which connects individual newspapers using an XML-aware overlay network 100 (and example of which is depicted in FIG. 1), solves the problem of subscribers/consumers (in this case, news readers) who desire information from one or more (or even all) relevant news sources, but may not know the locations of each of these sources. It also solves the problem of publishers (in this case, news providers) who desire their content to reach as many interested readers as possible, but who may not know the identity of all interested consumers.

For example, a sports fan who wants to continually obtain information about a particular player, a particular team, or a particular sport, may not know all the newspapers that may carry news that is relevant on any given day. In the super newspaper application, the fan could simply subscribe to information relating to the specific player, and all news articles published by any of the worldwide newspapers would be channeled to the sports fan. It is the job of the overlay network to connect all the relevant newspaper content to the interested news readers. Of course, the fan would want the super newspaper overlay network application to remove duplicates, so that the same news published by multiple newspapers (e.g., when the source is a news agency such as Reuters or the Associated Press) is presented to the fan only once.

The subscription may also be very fine grained (e.g., only when the particular team wins). Processing these types of fine grained, content-based, subscriptions requires some application layer function, which the overlay network 100 described herein provides. Without such network support, either the consumer must subscribe with each individual newspaper (clearly a non-scalable option) or the super newspaper provider must implement a super-site for harvesting all the news from individual sources and processing all the subscribers. Although GOOGLE and YAHOO are demonstrating the feasibility of the latter approach, it creates significant traffic concentration and processing bottleneck problems. Replication of the servers across the network would only solve part of the problem, since the servers would still need to store all the published content. By offering the functionality in the overlay network 100 described herein, such problems are avoided and the bar for new entrants into the content distribution is concomitantly lowered.

Prior subscription-type content distributions systems have not been adequate in many scenarios, for example, in the case of breaking news. In this and like scenarios, an ad hoc query may be more appropriate. For example, when a large scale disaster strikes, it is quite difficult for friends and relatives (who may be geographically quite distant from the disaster) to get information from the locales close to the disaster. They may not know the names of the news publishers in that part of the world, for example. The super newspaper application herein now enables an ad hoc query to gather all the news from those parts of the world, and enables consumers to get the desired information without having to know specifically the names of the individual content sources. If the topic of the ad hoc query becomes one of continuing interest, the one time ad hoc query can be replaced by a long term subscription.

In both the publish/subscribe and query/response scenarios, the same content may be added by multiple data sources. Indeed, many newspapers publish the same report from a news agency. A substantial benefit that the overlay network 100 of the present disclosure can provide is duplicate elimination, where only one copy of the document is delivered to consumers. Without this, the burden for duplicate elimination falls on the consumer itself, and also imposes unnecessary load on the network for delivering the redundant copies that will generally be discarded.

Related to this, another functionality that can be conveniently implemented by the network is relevance-score based filtering. In the publish/subscribe scenario, this functionality filters out any content with relevance scores lower than the top "k" scores of documents previously delivered to the same clients. (A variety of well-known means may be used for determining a relevance score). In the query/response case, the network delivers only the "k" most relevant responses to the query. By implementing this functionality in the overlay network 100, such unwanted content can be quickly identified and eliminated.

When the consumer sends a query or a subscription to particular designated types of content, the super newspaper is an application that seeks to aggregate, or otherwise process, relevant news items. It is natural to request that the returned results be transformed to attain some homogeneity, for example, that all the images be in-line within the XML content for ease of display. Further, different content representation may be appropriate for different devices utilized by the various consumers. Such content transformations are naturally expressed using existing XML query/transformation languages such as XSLT and XQUERY. Supporting this functionality in the overlay network 100 relieves individual applications from the need to implement it anew.

Another function that the overlay network 100 can offer is fine-grained access control. XML allows access control to be applied at a fine granularity, namely at the individual XML element level. While this functionality may not be relevant to certain super newspaper applications, it is very important in cooperative healthcare applications. For example, an XML document containing patient information may be delivered in full when requested by a medical doctor, and in an abridged form, without the sensitive medical history, when queried by hospital administration. Note that abridging a document for the purpose of access control is a particular case of content transformation.

Content sources routinely offer access control functionality and filter content sent to consumers according to the consumer's user credentials. However, with a large and growing number of content sources on the Internet, and with increasingly complex interactions, managing access control rules across this variety of (sometimes administratively independent) content sources grows ever more problematic. The overlay network 100, acting as a trusted intermediary, is a logical point to support access control in a manner that is systematic, coherent, and hard-to-bypass.

The key to the protocol framework is the need to support both a publish/subscribe as well as a query/response model for information dissemination in a scalable manner. When every overlay router in a network has to perform matching and filtering of XML content from publishers, it becomes an impediment to making the framework scalable. In prior packet networks, the fundamental building block for fast, scalable forwarding was to execute a lookup at each node in as simple a manner as possible, such as a longest prefix match or the lookup of a hash identifier (ID). The approach herein also recognizes that multicast offers a sound basis for minimizing the number of duplicate copies of a piece of data that traverse a link. However, a multicast framework such as IP multicast is limited in scalability because the global limit on the number of multicast groups supported. One solution for use herein is to exploit overlay multicast, with the flexibility of having a group for each distinct content description, so that e very fine grained distribution trees can be provided on an as-needed basis.

A fundamental question that arises in any publish/subscribe or query/response model is the basis for matching publications/data with subscriptions/queries. To address this, the overlay network 100 uses content descriptors (CDs), described in greater detail below. Each publication, or piece of content, is associated with a set of content descriptors that contain keywords or the like corresponding to the content (e.g., "./international/politics/mideast.for articles about international and mideast politics, or ./USA/business/energy/oil." for articles on the American oil and energy businesses). Analogously, subscriptions/queries may also be content descriptors, possibly with wildcards (e.g., "./international/*/mideast." queries could match content descriptors "mideast business," "mideast politics," and the like). Content descriptors are hierarchical in nature (as the examples above illustrate), akin in some respects to dimensions in data warehouses, topic hierarchies in ontologies, and XML data paths.

In the processes described herein, publishers 112 and consumers 114 advertise sets of CDs to the overlay network 100. For the publish/subscribe model, the publisher's data is forwarded to all the consumers/subscribers interested in the CD. For the query/response model, CDs in the form of queries are routed to the appropriate data sources.

Wildcard-free CDs form the basis for a content-based multicast group that enjoins publishers 112 of the CD and the consumers 114 for that CD. For every such CD, the overlay network 100 effectively constructs two core-based multicast trees with one core leading to all of the publishers 112, and one that leads to all of the consumers 114. The overlay network creates a coordinator for each such CD, selected dynamically, based on the first arrival of the CD from a publisher 112. The coordinator acts like a core in the core-based IP multicast framework.

As soon as a CD (from the publisher 112 or from a consumer 114) is sent to the overlay network 100, it is mapped into a set of small hash identifiers (e.g., a single identifier for a wildcard-free CD) at a first overlay router 102 of the network 100. This enables efficient mapping to the corresponding multicast trees for forwarding CDs of queries or content. Subsequent routers beyond the first (coordinator) router only forward CDs based on the hash identifier (ID) on the appropriate multicast tree.

In various embodiments, the functionality of the overlay network 100 and its routers 102 may be described generally by the exemplary flowchart of FIG. 2, in which one exemplary process 200 for disseminating content according to the present disclosure is displayed. The process 200 commences when a CD is received at a first router 102 in the overlay network 100 (step 202). The first router then determines whether the CD is a duplicate entry (step 204). If the CD is a duplicate, the process 200 continues directly to step 208 below. Otherwise, the process 200 continues to step 206 wherein the router designates itself as the coordinating router for the CD and generates a tuple corresponding to the CD. The tuple is then forwarded to other routers 102 in the overlay network 100 (step 208), thereby forming a tree, or path, for content related to the CD to be identified and transmitted. The process 200 then ends.

Particular functions of the overlay network 100 may be explored with respect to FIG. 3 wherein, various overlay XML routers (R), such as routers 102, and data nodes (D), which may include publishers 112 and consumers 114, are diagrammatically depicted, wherein each XML router knows the overlay network's topology.

One characteristic of the protocol used by the overlay network 100 is the creation of a coordinator for each CD that anchors further distribution tree constructions. The overlay XML router (R) next to the first data node (D) that transmits a particular CD elects itself as the coordinator for that CD and floods that information throughout the overlay network 100. In order to avoid data congestion, when there are parallel attempts by multiple coordinators to flood a CD, the coordinator with, for example, the smallest ID may be allowed to proceed. Other methods of electing a prevailing coordinator may likewise be used.

So, for example, if the data node labeled D3 in FIG. 3 publishes a data item with CD=<ABC>, the nearest overlay XML router, labeled R2, elects itself as the coordinator for that CD. The coordinator constructs a hash value based on the CD, and then floods the tuple (hash ID, <ABC>, coordinator-ID) to all the overlay routers in the network. The coordinator ID lists the ID of the coordinating router for the CD. The state stored in all the overlay XML routers 102 of the overlay network 100 includes a corresponding tuple (hash ID, <ABC>, publisher interface list), where the last item contains the list of interfaces towards the publisher 112 for this CD. For the non-coordinator routers of the overlay network 100, the publisher interface list may be a list of interface to the coordinator router. For the coordinator router, the publisher interface list may include a list of interfaces to the data node D3 that published the CD.

If subsequently, another data node D4 publishes the same CD=<ABC>, the adjacent overlay router R4 sends a publisher-join command to add the appropriate interfaces on its publisher interface list. In the present example, this means sending the command through the overlay network's topology towards the coordinator router, R2. This goes to R3 to R2, and in various embodiments, along the shortest path of overlay hops. When the router R3 receives the publisher-join command, it adds its link towards R4 to its publisher interface list for this CD. Similarly, overlay XML router R2 adds the link towards R3 in its publisher interface list for this CD. Thus, we have a tree of publishers formed. FIG. 2 reflects the routing state at this stage, with the first bracketed list at each router representing the publisher interface list.

Subsequent CDs that are announced by other publishers may follow the shortest path of overlay hops towards the coordinator router, but do not need to progress all the way to coordinator router once they hit an "on-tree node." For example, if D6 published a document with <ABC>, its publisher interface list would stop at R3 because the latter is an on-tree node. A router determines that it is an on-tree node if its publishers interface list contains a similar entry for the CD.

In another example, if a consumer on node D1 sends a query for <ABC>, the first overlay XML router, R1, adjacent to D1, processes the queried XML path to derive a hash function (or potentially a set of hashes if the submitted query contains multiple paths) to match what was computed earlier for that CD. With the hash, the overlay XML router R1 now knows the relevant tree, and forwards the message containing the hash and query according to the interfaces in the publisher interface list. Note that this list is guaranteed to include the interface towards the coordinator router. In the present example, the query is sent towards the coordinator router R2. R2 will in turn send the query on its publisher interface list, which includes D3 and R3. R3 will forward the query to R4, and then to D4. Thus, the query will be delivered to all relevant publishers.

One characteristic the overlay network 100 is that only the first overlay XML router 102 in the overlay network 100 that receives a query has to process the query. The remaining routers do not have to process the query, and just use the hash ID to determine where to send the query, similar in result to traditional multicasts, along all the interfaces that are marked with senders for that hash ID. Use of the hash ID therefore avoids the processing of queries at all the routers 102. Instead, this allows each subsequent router to perform a simple hash lookup in place of full processing.

Each data source receiving a CD from the overlay network 100 may, of course, process a received query in its entirety. The source may have multiple documents that match the query. The data source (e.g., publisher 112) may not have exposed the entire internal structure of the document in the original CD announcement. Thus, it is useful for the data source to process the entire query. Access control may be implemented at the data source, based on which consumers 114 may in fact obtain the query response.

When a consumer 114 sends a subscription corresponding to a CD, or a group of CDs, to an adjacent overlay router, a subscriber-join command may be multicast to publishers 112 over an appropriate publisher tree in the overlay network 100. In the process, the subscriber-join also sets up a second logical tree (subscriber tree), along which published data matching the subscription will flow. Thus, the routing state entry described in the previous subsection is augmented with a subscriber interface list. Each overlay XML router 102 receiving a subscriber-join adds the interface from which the subscriber join was received to the subscriber interface list for the received CD hash. As with publisher-joins, the propagation of subscriber-join messages stops at overlay routers 102 that are already on the subscriber tree (e.g., one which has a subscriber interface list with the appropriate list). When a new publisher 112 arrives on an interface of a router 102 that already has an existing subscription for a CD (e.g., the overlay router is an on-tree node for that subscriber), then the subscriber join is sent to the overlay XML router adjacent to that publisher 112, thus extending the subscriber tree up to the appropriate publisher 112.

In the example of FIG. 3, assume that D5 wants to subscribe to updates to the content described by the CD=<ABC>. This subscriber-join command is sent to R4, the nearest overlay router. The state for the subscription tree is created at R4, which forwards along the publisher interface list to router R3. R3 creates the state for this subscription tree and forwards it to R2. A subsequent subscription from node D6 for the same CD (an identical subscription to the previous one) will stop at R3 because it is an on-tree node for the subscription tree. R3 adds D6 to its subscriber interface list. However, there is no need to propagate the subscription further, since all publication of content corresponding to CD=<ABC> will be forwarded to R3, and thereafter by R3 to D6.

The routing state at this stage is shown in FIG. 3, with the second bracketed lists representing the subscriber interface lists. There are several cases to be considered, especially those involving subscriptions with wild-cards.

For example, if the subscription is subsumed by an existing subscription, the new subscription is sent towards the coordinator router of the more general subscription and joins the tree of the subsuming subscription. If, however, this subscription partially overlaps with another subscription, the new subscription may instead be split into two parts: one that is totally subsumed by another subscription and the remaining unique part. The router then sends the subsumed part towards the pre-existing coordinator of the subsuming subscription and joins the corresponding tree. The router closes to the subscriber may also become the coordinator of the unique part. If, alternatively, the subscription does not overlap with any existing subscriptions, or the overlap is too small to yield significant performance improvements, the first router acts as a new coordinator router for the unique CD.

It is highly desirable to suppress duplicate response to queries of multiple databases, as well as the same content being sent by multiple publishers. Duplicate elimination for responses to queries may be optional, and may or may not be specified in the query or response (e.g., via a flag) to direct the overlay network to eliminate duplicates. For performing duplicate elimination, it is assumed that there is a reasonably accepted notion of which fields to examine to determine that the document is a duplicate. For example, the date, title and author or source of the document may be used when determining whether it is a duplicate of an already seen document. The network may use a Message Digest 5 (MD5) hash of the content to match for duplicates. Alternatively, the overlay XML network router may build an XML tree of a newly received document. If its XML tree is subsumed by a previously received document's XML tree, as per any of a variety of useful similarity tests, then the newly received CD for such content is not forwarded. Otherwise, the newly received CD may be integrated in the overall XML tree structure. When taking advantage of the XML structure of the content, the additional task that may have to be performed by the overlay router would be to construct a hash for the content at the leaves of the XML tree structure. The closest router 102 in the overlay network 100 to a publisher 112 responding to the query would be the one to generate the hash.

The first response is delivered to the consumer or subscriber 112 generating the query. The state associated with duplicate elimination has to be retained at the overlay network routers until all responses have been received. Of course, the amount of time needed to receive all the responses is generally not known. Therefore, the network may use a timer or the like to determine when an overlay network router stops looking for duplicates and discards the state built up. Every router in the overlay path from the first overlay router adjacent to the publisher/content would have to maintain the timer, and each response received (whether duplicate or not) would reset the timer at the overlay router. While the timer is ON, duplicate elimination would occur, and the overlay router would maintain state associated with each distinct copy. When the timer expires, then the state associated with the response (or published content) would be discarded.

Thus far, only responses that are exact matches to a query have been explored. When a document contains multiple items, and it matches only approximately with the content, users may need the network to present only the top ranked responses (up to some number "k"). Various methods for ranking the top k responses may be readily adapted and used herein.

Regarding responding to queries in a ranked manner, the first router that receives an initial response may start a priority queue structure for the response based on the pre-specified ranking system, and forwards the response towards the appropriate consumer(s) or subscriber(s). Any subsequent response that arrives related to the query (or subscription) updates the priority queue and only messages that have a higher rank are sent out. All the intermediate overlay routers continue to forward responses that have a higher ranking. It is up to the router that is adjacent to the appropriate consumer/subscriber to queue all the responses received, and finally release only the top k responses received. Only this overlay router would need to maintain a timer, which ensures that all the responses have been received.

One observation to note is that, at any hop in the overlay network 100, the messages going out will not result in saving significant bandwidth on the links, if the rank of the received messages is monotonically increasing. However, this should occur infrequently. In any case, since the overlay router adjacent to the subscriber buffers all the received responses until it has received all responses (based on the timer at this node), the subscriber only receives the top k responses, and does not have to perform additional filtering.

In various embodiments, the overlay network 100 may include various known and developing facets, including recent advances in XML processing, such as XML indexing, XML filtering and publication/subscription support, XML transformation and XML transcoding. In addition, languages having similar structure or functionality to XML, or later developed versions of XML, may be used with suitable adaptation in the overlay network 100 of the present disclosure.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for disseminating content over an overlay network having a plurality of routers in communication with providers and consumers of content, the method comprising:
    receiving, at a first router in an overlay network, a content descriptor corresponding to a content published by a first publisher;
    generating a hash identifier based on the content descriptor at the first router in the overlay network;
    generating, at the first router, a publisher interface list associated with the first publisher;
    transmitting the hash identifier and the publisher interface list to a plurality of subsequent routers in the overlay network, wherein queries received by the subsequent routers that correspond to the content will be routed to the first router based on the hash identifier and the publisher interface list;
    receiving, at one of the plurality of subsequent routers, a content descriptor corresponding to content from a second publisher, wherein the content descriptor and the content from the second publisher are the same as the content descriptor and the content from the first publisher; and
    updating the publisher interface list only in the one of the plurality of subsequent routers based on receiving the content descriptor corresponding to the content from the second publisher, wherein queries corresponding to the content received at the one of the plurality of subsequent routers is routed to the first router and to the second publisher based on the updated publisher interface list in the one of the plurality of subsequent routers.

2. The method of claim 1, said generating a hash identifier further comprising:
    generating a Message Digest 5 (MD5) hash of the content descriptor.

3. The method of claim 1, wherein the content descriptor comprises a hierarchical series of keywords.

4. A method for disseminating content over an overlay network having a plurality of routers in communication with providers and consumers of content, the method comprising:
- receiving, at a first router in an overlay network, a content descriptor corresponding to a first query for content from a first node;
- generating a hash identifier based on the content descriptor at the first router in the overlay network;
- generating, at the first router, a subscriber interface list based on receiving the first query for the content from the first node;
- transmitting the hash identifier and the subscriber interface list to a plurality of subsequent routers in the overlay network, wherein content identified by the subsequent routers that correspond to the query will be routed to the first router based on the hash identifier and the subscriber interface list;
- receiving, at one of the plurality of subsequent routers, a content descriptor corresponding to a second query for the content from a second node, wherein the content descriptor and the first query from the first node are the same as the content descriptor and the second query from the second node; and
- updating the subscriber interface list only in the one of the plurality of subsequent routers based on receiving the content descriptor corresponding to the second query from the second node transmitting the second query for the content, wherein content corresponding to the first and second queries received at the one of the plurality of subsequent routers is routed to the first router and to the second node based on the updated subscriber interface list in the one of the plurality of subsequent routers.

5. The method of claim 4, a content descriptor comprising:
- generating a Message Digest 5 (MD5) hash of the content descriptor.

6. The method of claim 4, wherein the content descriptor comprises a hierarchical series of keywords.

7. A method for disseminating content over an overlay network having a plurality of routers in communication with providers and consumers of content, the method comprising:
- receiving, at a first router in the overlay network nearest to a publisher, a unique content descriptor for content published by the publisher;
- generating, at the first router, a first tuple comprising a first hash identifier corresponding to the content, the unique content descriptor, and a publisher interface list;
- transmitting the first tuple from the first router to a plurality of subsequent routers in the overlay network;
- receiving, at a second router included in the plurality of subsequent routers in the overlay network nearest to a first consumer, a content descriptor corresponding to a first query for the content by the first consumer;
- generating, at the second router, a second tuple comprising a second hash identifier corresponding to the query, the content descriptor corresponding to the query and a subscriber interface list;
- transmitting the second tuple to the plurality of subsequent routers in the overlay network and the first router;
- receiving, at a third router included in the plurality of subsequent routers in the overlay network nearest a second consumer, a content descriptor corresponding to a second query for the content by the second consumer, wherein the content descriptor and the second query from the second consumer are the same as the content descriptor and the first query from the first consumer;
- updating the subscriber interface list only in the third router based on receiving the content descriptor corresponding to the second query from the second consumer;
- comparing the first hash identifier to the second hash identifiers at the first router;
- transmitting the content to the third router from the first router, when the first hash identifier matches the second hash identifier; and
- transmitting the content from the third router to the second consumer and to the second router based on the updated subscriber list in the third router.

8. The method of claim 7, said generating a hash identifier further comprising:
- generating a Message Digest 5 (MD5) hash of the content descriptor.

9. The method of claim 7, wherein the content descriptor comprises a hierarchical series of keywords.

* * * * *